(12) United States Patent
Handa

(10) Patent No.: US 8,136,557 B2
(45) Date of Patent: Mar. 20, 2012

(54) WARMING FOR HIGH PRESSURE HYDROGEN GAS STORAGE CYLINDERS UTILIZING THE JOULE-THOMSON EFFECT

(75) Inventor: Kiyoshi Handa, Takanezawa-cho (JP)

(73) Assignee: Honda Motor Co., Ltd., Tokyo (JP)

( * ) Notice: Subject to any disclaimer, the term of this patent is extended or adjusted under 35 U.S.C. 154(b) by 1144 days.

(21) Appl. No.: 11/947,820

(22) Filed: Nov. 30, 2007

(65) Prior Publication Data

US 2009/0142637 A1  Jun. 4, 2009

(51) Int. Cl.
*B65B 1/20*  (2006.01)
(52) U.S. Cl. .......................................... 141/82; 141/231
(58) Field of Classification Search ............... 141/82, 141/94, 231; 165/60
See application file for complete search history.

(56) References Cited

U.S. PATENT DOCUMENTS

| | | | |
|---|---|---|---|
| 5,092,281 A * | 3/1992 | Iwaki et al. | 123/3 |
| 6,436,562 B1 | 8/2002 | DuBose | |
| 6,548,199 B1 | 4/2003 | Tanaka | |
| 6,675,573 B2 | 1/2004 | Kempfer | |
| 6,692,852 B2 | 2/2004 | Yang | |
| 6,708,718 B2 * | 3/2004 | Yamada et al. | 137/255 |
| 6,865,901 B2 | 3/2005 | Horn | |
| 2002/0027027 A1 | 3/2002 | Skala | |
| 2002/0098396 A1 | 7/2002 | Kobayashi | |
| 2002/0168556 A1 | 11/2002 | Leboe | |
| 2003/0235734 A1 | 12/2003 | Halltiner, Jr. | |
| 2004/0055798 A1 | 3/2004 | Almkermann | |
| 2004/0058215 A1 | 3/2004 | Bruck | |
| 2004/0081872 A1 | 4/2004 | Herman | |
| 2004/0137295 A1 | 7/2004 | Houlberg | |
| 2004/0151959 A1 | 8/2004 | Formanski | |
| 2004/0209135 A1 | 10/2004 | Wexel | |
| 2004/0229099 A1 * | 11/2004 | Standke et al. | 429/26 |
| 2005/0095477 A1 | 5/2005 | Perry | |
| 2005/0103479 A1 | 5/2005 | Richardson | |
| 2005/0175870 A1 | 8/2005 | Hagan | |
| 2005/0191534 A1 | 9/2005 | Kim | |
| 2006/0180235 A1 * | 8/2006 | Kubo et al. | 141/82 |

FOREIGN PATENT DOCUMENTS

DE   10242804   4/2004

* cited by examiner

*Primary Examiner* — Gregory Huson
*Assistant Examiner* — Jason Niesz
(74) *Attorney, Agent, or Firm* — Porter Wright Morris & Arthur LLP

(57) ABSTRACT

A warming system for a high pressure hydrogen gas storage tank in a motor vehicle for maintaining the temperature of the gas within the tank and the gas flow control components associated with one or more boss at the tank ends above the lower design temperature tolerance limit of the tank and components associate with the utilizing the Joule-Thomson effect in gas flowing from the tank to recycles the mechanical energy of heat compression in high pressure hydrogen fuel to warm the gas within the tank as the high pressure gas is utilized.

8 Claims, 6 Drawing Sheets

WARMING FOR HIGH PRESSURE HYDROGEN GAS STORAGE CYLINDERS UTILIZING THE JOULE-THOMSON EFFECT

FIELD OF THE INVENTION

The present invention relates to warming high pressure hydrogen gas storage tanks by utilizing the Joule-Thomson effect. Warming compensates for thermal and mechanical stresses caused by a low temperature resulting from (1) gas decompression in the tank as the gas is depleted from the tank and (2) environmental exposure of the tanks in low temperature climate conditions. The present invention warms the gas stored within the tank and ameliorates mechanical stresses to the tank and the component parts of the tank caused by the thermal conditions of the tank environment and thermal changes in gas temperature associated with the depletion of high pressure gas from the tanks by utilizing the energy stored in the gas as a result of the refilling/pressurization process. The invention is useful in on board storage tanks in hydrogen powered (fuel cell and internal combustion) vehicles

BACKGROUND OF THE INVENTION

Fuel cell and internal combustion engine vehicles powered by hydrogen gas may include on board high pressure gas fuel tanks that may include gas absorbing materials within the tank interior. In previous applications for United States Letters patent, I have described that during driving, gas remaining in a tank becomes cold when tank pressure decreases as gas is consumed by the vehicle power plant and the tank decompresses. In cold climates, the tank internal gas temperature can drop to −60° C. or below, a temperature that may be below the permissible operating temperature of O-rings, or other rubber seals, or gas flow controls in the tank assembly. An excessively low temperature in the tank may upset design tolerance limits for the seals and flow controls and cause the stored gas to leak as a result of temperature caused stresses in the tank system assembly. For example, when the ambient temperature is −20° C., the reduction of internal tank temperature by an additional −40° C. due to gas decompression effects will result in an internal temperature in the gas tank of −60° C. or below. Expansion and contraction of the tank and the component parts of the gas flow system associated with the tank may produce adverse mechanical stress effects.

Hydrogen gas generates heat when the pressure of gas maintained under high pressure decreases to a level approximating the lower pressure in a gas flow line. This phenomenon is known as the Joule-Thomson effect, singular to hydrogen and helium, and is used in the invention to recycle the mechanical energy of heat compression in the hydrogen fuel stored in a tank during the refill process to warm the gas and/or the tank assembly as the decompression energy stored in the gas is utilized during the driving condition of a vehicle.

OBJECTS OF THE INVENTION

It is an object of the present invention to provide a warming system for high pressure hydrogen gas storage tanks. Warming will reduce the risk of a fuel gas leak in cold climate driving conditions caused by excessively low tank and/or gas temperatures. Utilizing the Joule-Thomson effect, the decompression energy stored in the gas is utilized to warm the tank system.

The invention is described more fully in the following description of the preferred embodiment considered in view of the drawings in which:

DETAILED DESCRIPTION OF THE INVENTION

In brief, the invention provides a warming system for a high pressure hydrogen gas storage tank utilizing Joule Thompson energy in vehicles powered by powered by hydrogen gas. Environmentally, a typical ambient temperature is approximately 20° C. In cold climates, the internal gas temperature in a vehicle tank can drop to −60° C. or lower, a temperature that may be below the permissible operating temperature range of O-ring and/or other rubber or polymer seals used in the tank and the port inlet and outlet metal part assemblies that control the inflow and outflow of gas to and from the storage tank. Below the acceptable temperature range, variances allowable for seals, valves, control devices, and the like, may be exceeded by thermally caused mechanical variations in the tank and associated assemblies. Leakage of the stored gas may result. The invention provides a solution that warms the storage tank system by recovering the energy stored in hydrogen consumed when the $H_2$ gas is refilled to a high pressure, such as 30-35 MPa. When the gas is decompressed to 1 MPa during use, Joule Thomson energy is recovered as heat for warming the remaining gas and/or tank assembly components.

Figure 1:
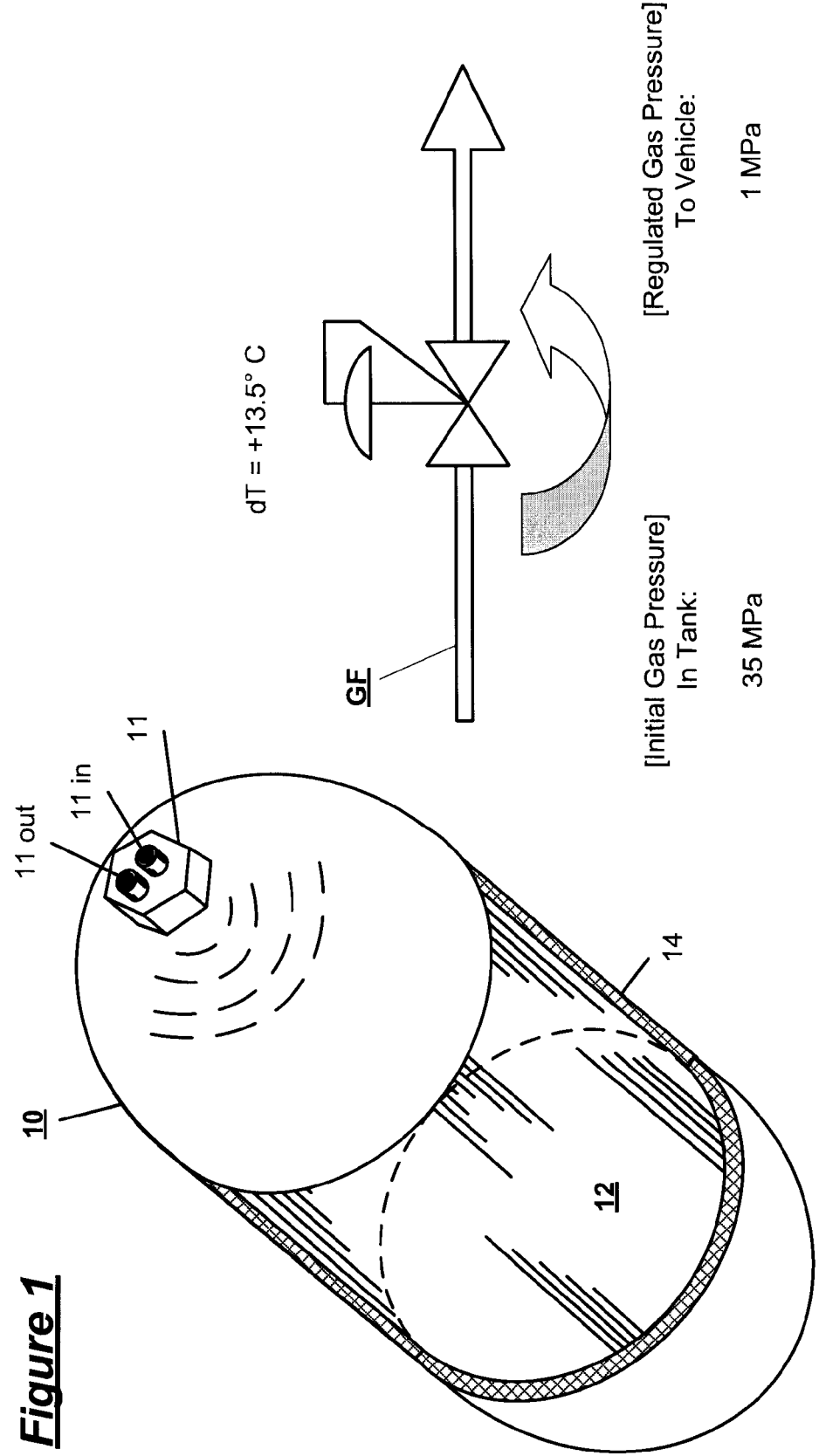
FIG. 1 is a diagram showing the calculation of the heat recovery available for gas warming utilizing the Joule Thompson effect as hydrogen stored within the tank is decompressed while used for vehicle operation.

High pressure tanks are typically cylindrical having semi spherically shaped dome ends and are formed from a composite shell, a mixture of resin and carbon fiber embedded therein. Tanks may also include supplemental shells such as an outer shell and an interior liner, and other layers. With reference to FIG. 1, a typical high pressure gas storage tank 10 having an interior volume 12 for the storage of hydrogen is shown with sidewall structure 14, including a boss 11 at one end. A gas inlet and a gas outlet are shown at boss 11 as 11 in and 11 out. Depending on design preference, the tank may include additional bosses or bosses with configurations differing from that shown. Driving and parking temperature conditions in the vehicle tank system are charted in FIG. 2.

Figure 2:
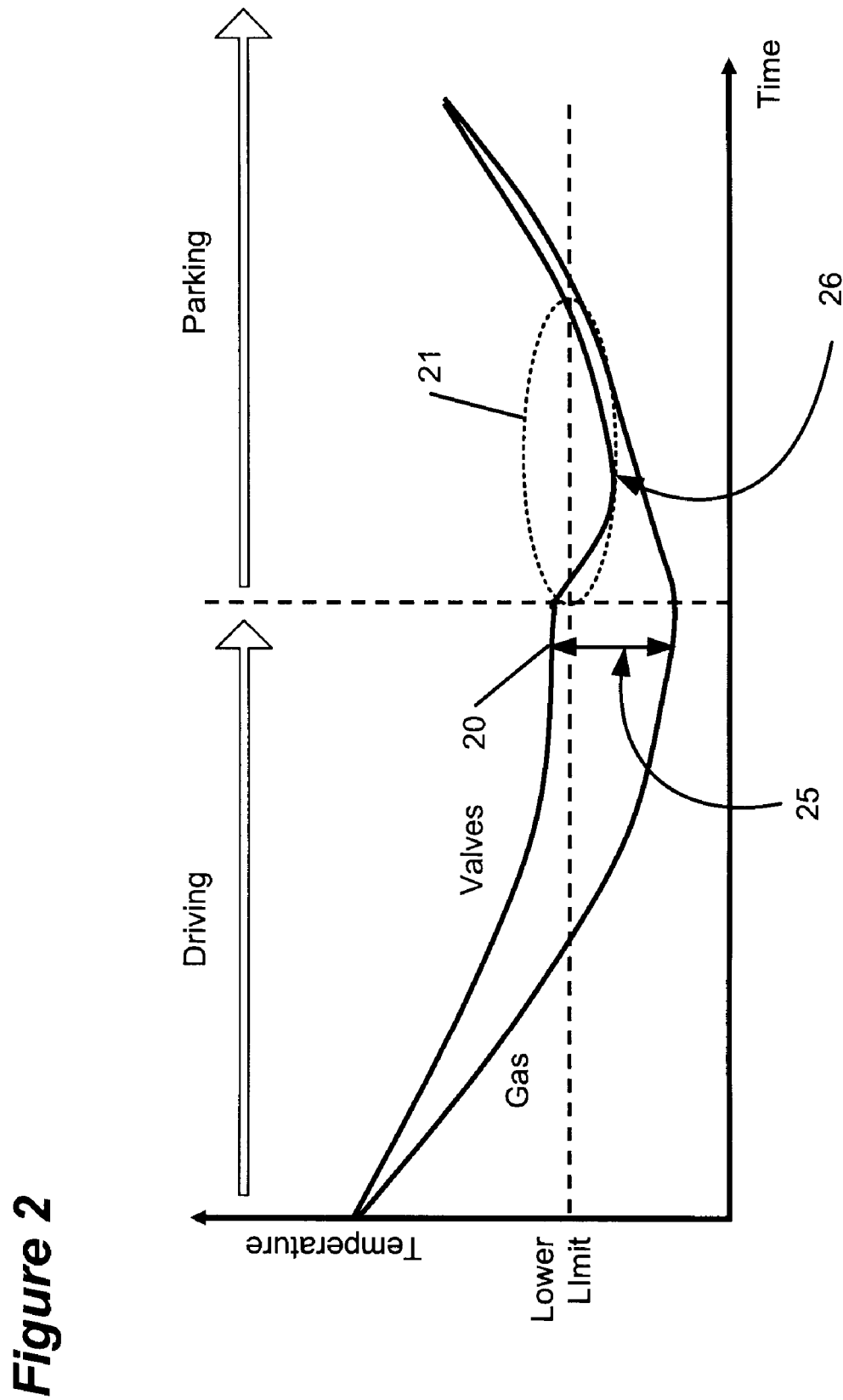
FIG. 2 is a chart of gas and valve temperatures of the tank plotted against a time axis depicting relative temperatures of the gas within the tank and the metal boss elements during the vehicle conditions of driving and parking. The cooling of the metal components after driving is shown wherein valve temperatures are below the lower tolerance limit after driving.

During driving, the gas temperature may exceed the lower tolerance limit of the tank system by the temperature difference shown as 25. In a typical parking condition, FIG. 2 illustrates that with time, the temperature 20 of the valve system cools to a difference 26 such that, in the period shortly after parking 21, the valve temperature 20 cools below the lower acceptable limit of the system temperature tolerance.

Figure 3:
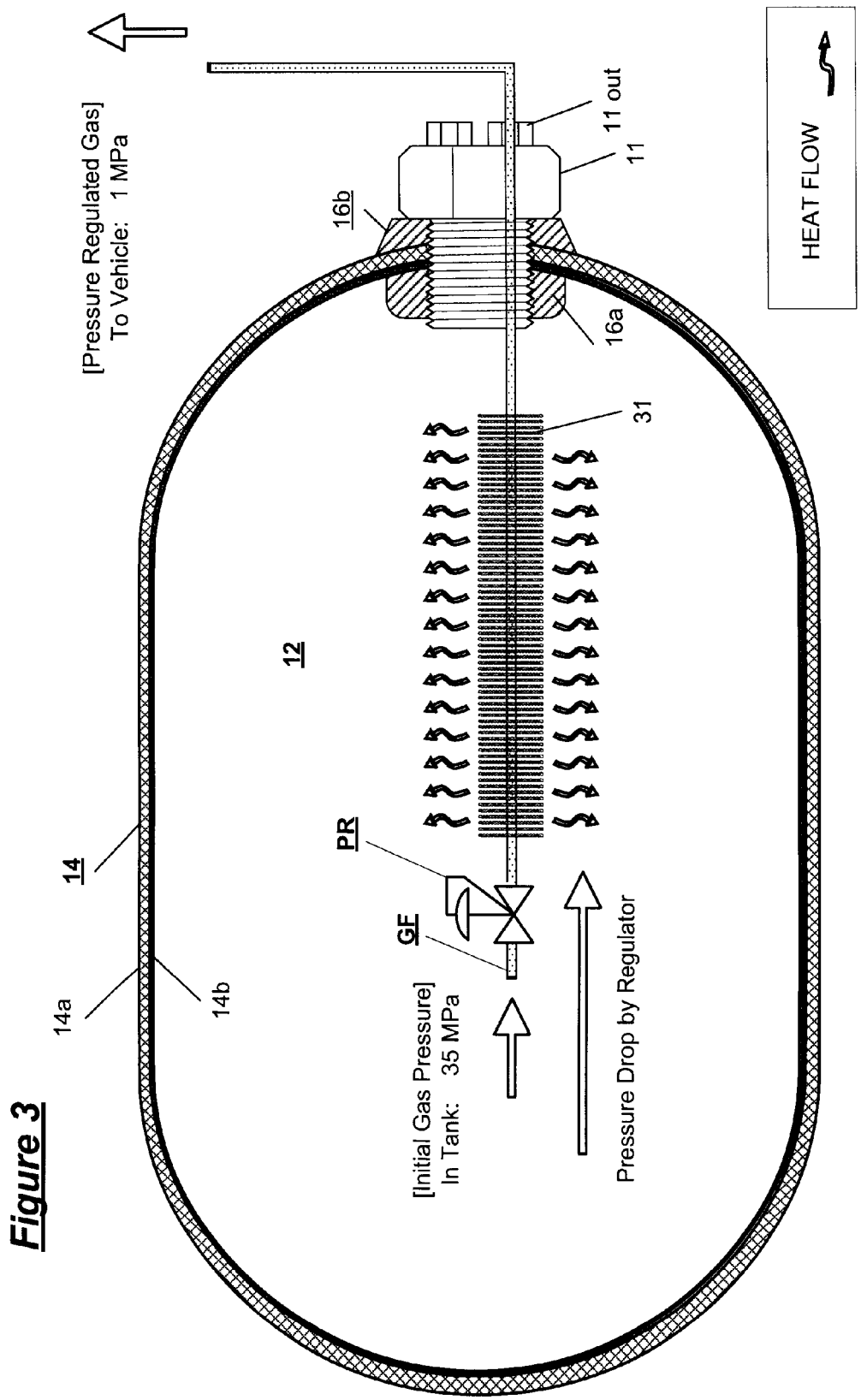
FIG. 3 is a side view of a tank structure using a heat exchanger internal to the tank heating the hydrogen gas output during tank depletion using the Joule Thomson energy of the hydrogen gas outflow during the decompression of the tank as the vehicle is driven.

FIG. 3 depicts the structure of an example of a Joule Thomson warming system: a tank 14, formed from a carbon fiber resin composite shell 14a and liner 14b, an interior volume for gas storage 12, boss 11, and gas outflow conduit 11 out. In the example of FIG. 3, the gas stored under high pressure, 30-35 MPa, in the tank volume flows through conduit GF to pressure regulator PR and internal heat exchanger 31, where the Joule Thompson heat energy is released into the tank gas as the hydrogen is depleted from the tank. Heat flow is shown by the arrows ⁓.

Figure 4:
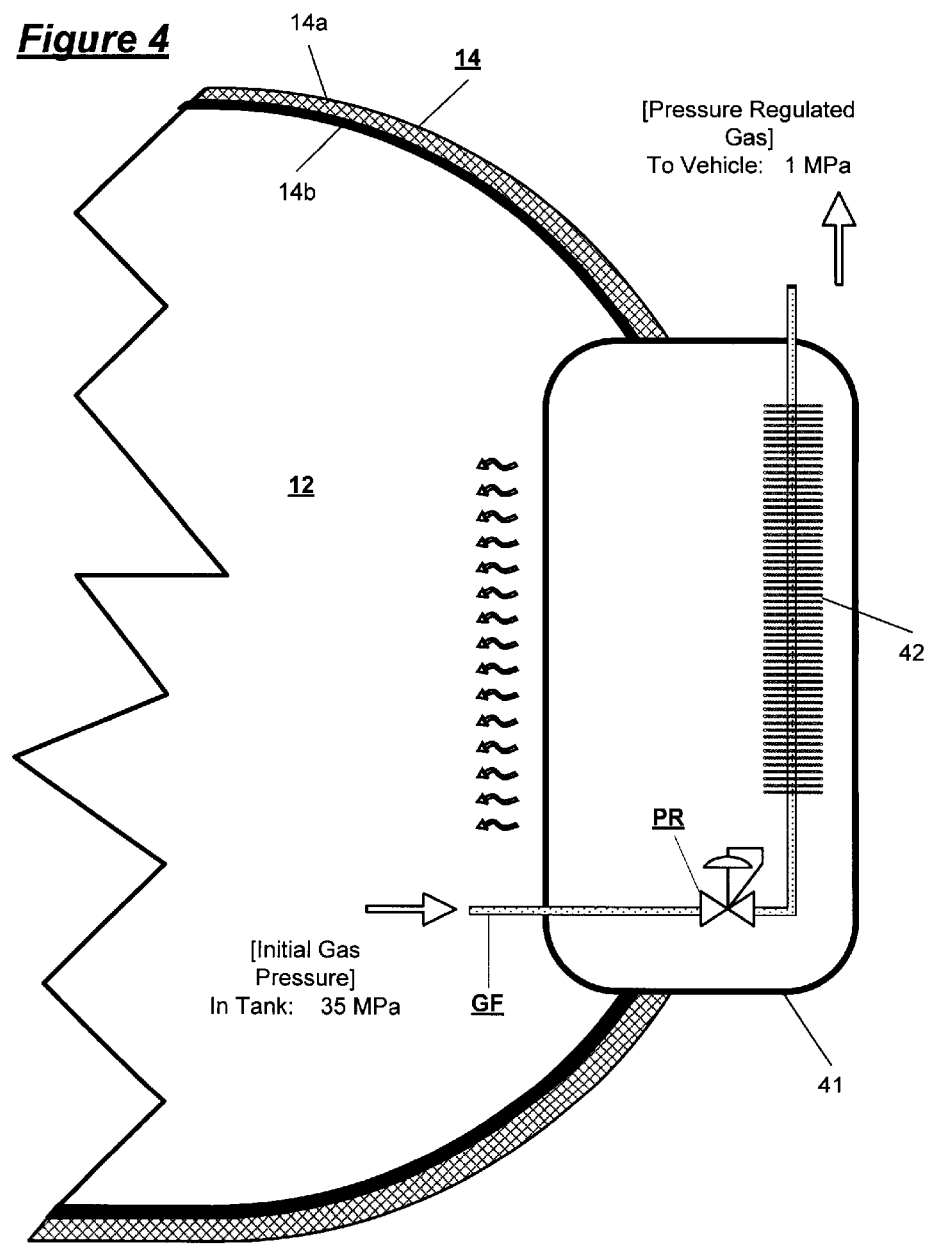
FIG. 4 is a side view of a warming system of the invention wherein the heat exchange of Joule Thomson energy occurs within a metal tank boss that houses embedded tank flow control devices.

In FIG. 4 an example of the warming system of the invention at a tank boss 41 at one end of the tank is shown in a side view. In this example, gas flow outlet conduit GF leads from the tank interior 41, where initial pressure is 35 MPa through pressure regulator PR, also embedded in the tank boss, for heat exchange between the decompressed gas and the boss, nut, port, or tank, as the pressure regulated 1 MPa gas flows to the vehicle power plant.

Figure 5:
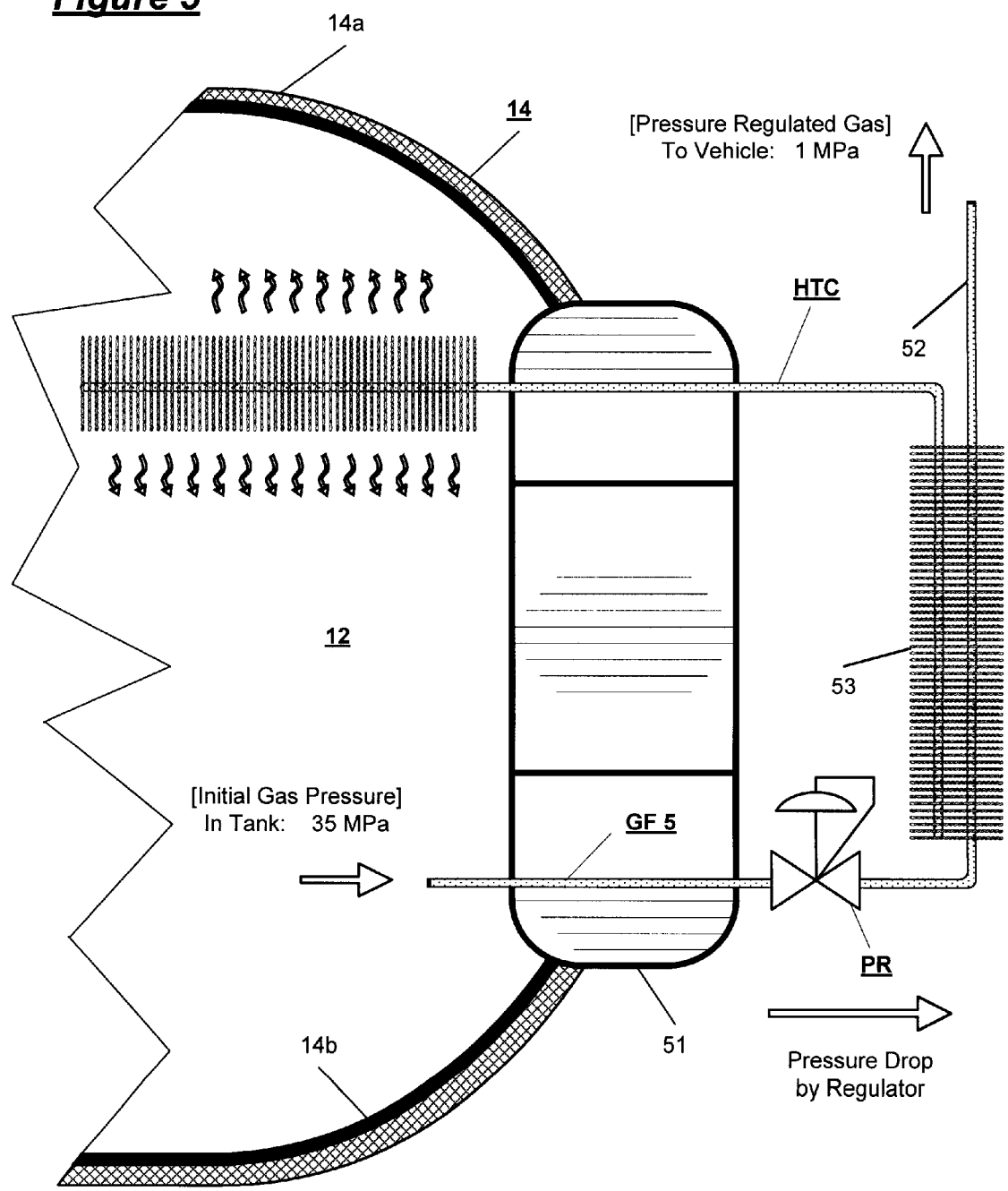
FIG. 5 is a side view of a tank structure using a heat exchanger external to the tank heating the gas through an internal heat exchanger using the stored Joule Thomson energy of hydrogen decompression as an energy source for heating in the gas flow system.

In FIG. 5, an external heat exchanger and an internal heat exchanger are utilized in a further example of the warming system of the invention. Gas flow outlet conduit GF 5 leads from the tank interior volume 12, where initial pressure is 35 MPa, and flow is directed in the conduit through boss 51 to external pressure regulator PR. After pressure regulator PR hydrogen gas flowing to the vehicle power plant has a pressure of 1 MPa. Intermediate in the gas flow conduit GF 5, between the regulator PR and the gas outlet to the vehicle 52 is a heat transfer system, including heat exchange device 53, conveying heat captured from GF 5 to the tank interior 12 where the heat captured is radiated to the remaining high pressure gas stored therein. The recovered/captured Joule Thomson heat is conveyed from HEX 53 through a heat pipe, coolant circulator, or like heat transfer conduit, HTC, to internal radiator (or HEX) 54 wherein the recovered heat is radiated and warms the remaining gas stored in the tank.

Thus, the system of the invention recycles heat recovered from the mechanical energy of gas compression stored in the gas during the refill process for use as a warming agent for gas remaining in the tank as the gas is consumed. The system of the invention may be used with a supplemental heating system such as described in my co-pending applications for patent SELECTIVE WARMING AND HEAT ISOLATION FOR ON BOARD HIGH PRESSURE STORAGE TANKS INSTALLED ON GAS FUELED VEHICLES, Ser. No. 11/935,637 filed on Nov. 6, 2007; INDUCTION HEATING SYSTEM FOR FIBER COMPOSITE GAS STORAGE CYLINDERS [to be filed] and CARBON FIBER WARMING SYSTEM FOR FIBER COMPOSITE GAS STORAGE CYLINDERS [to be filed].

Figure 6:
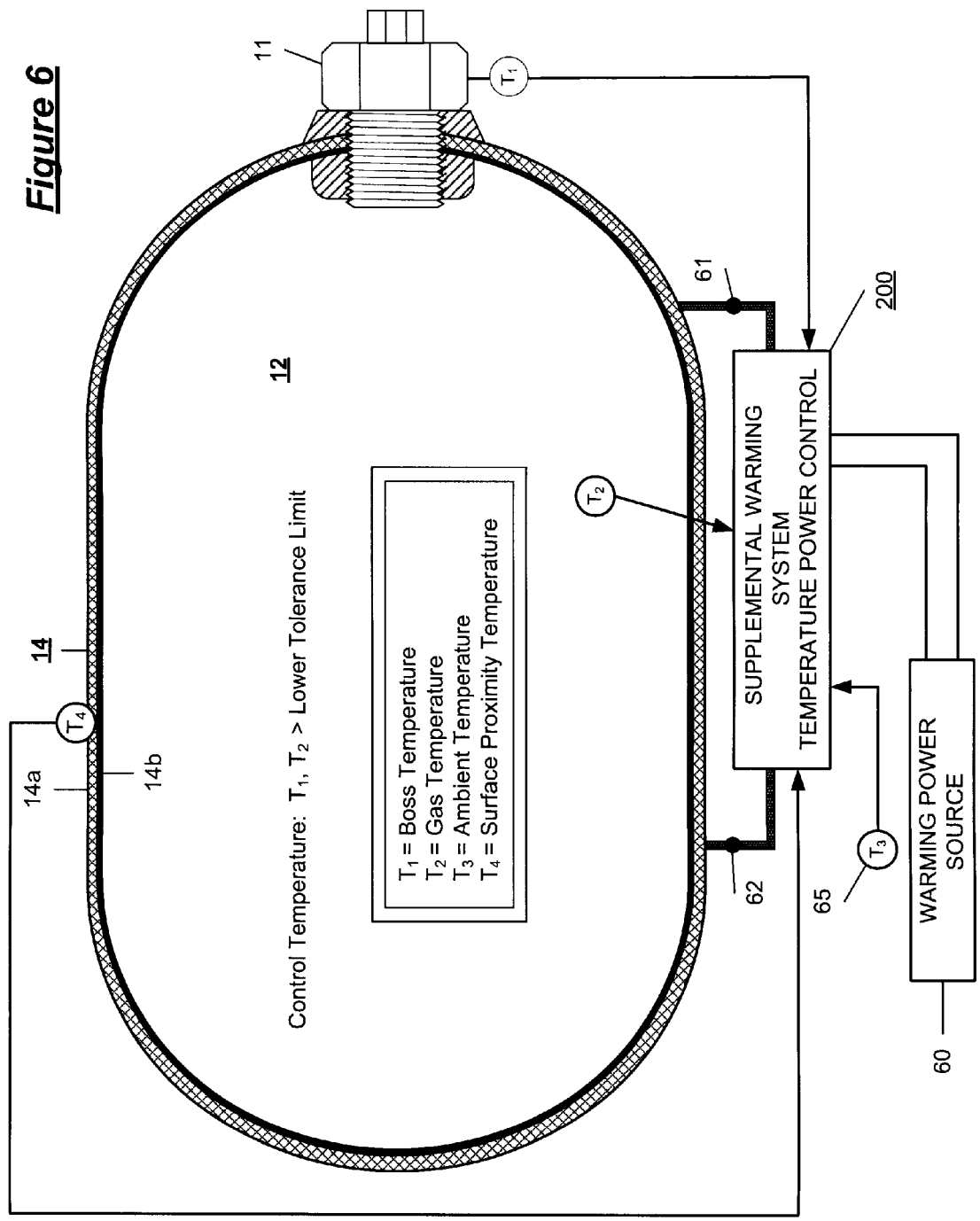
FIG. 6 illustrates a temperature control system utilized when the invention is combined with a supplemental warming system.

In an example incorporating both Joule Thomson heating and a supplemental warming system, a temperature power control system as is shown in FIG. 6 may be utilized for overall temperature monitoring and regulation. In the example in FIG. 6, sensors measure $T_1$=Boss Temperature; $T_2$=Gas Temperature; $T_3$=Ambient Temperature; and $T_4$=Surface Proximity Temperature. The sensed temperatures are input into the power control system 200 that regulates power input into the supplemental system and thereby regulates overall gas and tank temperature such that the Control Temperature, generated by Joule Thomson heating and the supplemental warming system, regulated by the control processor system 200, is: $T_1$, $T_2$>Lower Tolerance Limit of the tank and valve components. Control system 200 regulates the energy flow from the warming power source 65 input into the supplemental warming system. The supplemental warming may be provided either an electrical system or a fluid system, interconnected to the tank at regulated power energy input connectors 61 and 62. With reference to FIG. 2 showing temperatures in various operating modes, the control system 200 maintains the system temperatures such that the differentials shown as 25 and 26 are eliminated and the lower tolerance limit of the system is not exceeded.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A warming system for hydrogen gas stored under high pressure in an on board motor vehicle tank for increasing the temperature of the gas within the tank and the gas flow control components associated with one or more boss at an end of the tank to a level above the lower design temperature tolerance limit of the tank and flow control components comprising:
a high pressure hydrogen gas storage tank; a conduit for gas flow leading from high pressure gas stored in the tank to a pressure regulator that reduces the pressure of the gas flowing in the conduit to a level suitable for use in the vehicle power plant; and a heat exchange device operatively interconnected with the conduit for gas flow disposed after the pressure regulator and before the gas inlet to the vehicle power plant, whereby the Joule-Thomson effect in gas flowing through the conduit is captured as heat and the heat captured is utilized to warm the gas within the tank and/or the flow control components of the tank assembly as the high pressure hydrogen gas is utilized during vehicle operation.

2. The system of claim 1 wherein the gas flow conduit, the pressure regulator and the heat exchange device are embedded in a boss at one end of the tank.

3. The system of claim 1 wherein a) a gas flow conduit leads from the tank interior volume and passes through a pressure regulator external to the tank, b) the gas flow conduit leads through a heat transfer system where captured Joule Thomson heat is recovered; c) a heat transfer device from the heat transfer system conveys the captured heat back through the boss to the tank interior; and d) the system further includes a radiator in the tank interior interconnected with a gas flow conduit interconnected with the heat transfer system; whereby the captured Joule Thomson heat is radiated in the tank interior.

4. The warming system of claim 3 wherein the heat transfer device from the heat transfer system comprises one of a heat pipe and a coolant circulator.

5. The system of claim 1 including a supplemental warming system for maintaining the temperature of the tank and the flow control components associated with the tank at a temperature above the lower temperature tolerance limit of the tank and flow control components.

6. The system of claim 5 including a temperature control system comprising: temperature sensors to provide measurement of temperature data for input into the control system, the sensors measuring one or more of tank temperature, valve temperature, gas temperature, and ambient temperature; and the temperature control system determining a warming control temperature such that the temperature of the gas in the tank and the flow control components associated with the tank does not drop below the lower tolerance temperature limit of the tank and flow control components associated with the tank.

7. A warming system for a high pressure hydrogen gas storage tank in a motor vehicle for maintaining the temperature of the gas within the tank and the gas flow control components associated with the tank above the lower design temperature tolerance limit of the tank and flow control components associated with the tank comprising: 1) a high pressure hydrogen gas storage tank; a conduit for gas flow leading from high pressure gas stored in the tank to a pressure regulator that reduces the pressure of the gas flowing in the conduit to a level suitable for use in the vehicle power plant; and a heat exchange device operatively interconnected with the conduit for gas flow disposed after the pressure regulator, whereby the Joule-Thomson effect in the flowing gas recycles the mechanical energy of heat compression in the high pressure hydrogen fuel to warm the gas remaining within the tank as the high pressure gas is utilized; 2) a supplemental warming system for the tank and flow control components associated with the tank; and 3) a temperature control system including temperature sensors to provide measured temperature data for one or more of tank temperature, valve temperature, gas temperature, and ambient temperature; an interconnection of the sensors with a power control processor; and a power control processor for maintaining the warming temperature such that the control temperature of the gas does not drop below the lower tolerance temperature limit of the tank and flow control components associated with the tank.

8. A warming system for a high pressure hydrogen gas storage tank in a motor vehicle for maintaining the temperature of the gas within the tank and the gas flow control components associated with the tank above the lower design temperature tolerance limit of the tank and flow control components associated with the tank comprising: 1) a high pressure hydrogen gas storage tank; a conduit for gas flow leading from high pressure gas stored in the tank to a pressure regulator that reduces the pressure of the gas flowing in the conduit to a level suitable for use in the vehicle power plant; and a heat exchange device operatively interconnected with the conduit for gas flow disposed after the pressure regulator, whereby the Joule-Thomson effect in the flowing gas recycles the mechanical energy of heat compression in the high pressure hydrogen fuel to warm the gas remaining within the tank as the high pressure gas is utilized; 2) a supplemental warming system for the tank and flow control components associated with the tank; and 3) a temperature control system including temperature sensors to provide measured temperature data for one or more of tank temperature, valve temperature, gas temperature, and ambient temperature; an interconnection of the sensors with a power control processor; and a power control processor for maintaining the warming temperature such that the control temperature of the flow control components associated with the tank does not drop below the lower tolerance temperature limit of the tank and flow control components associated with the tank.

\* \* \* \* \*